(12) United States Patent
Brueck et al.

(10) Patent No.: US 12,553,771 B2
(45) Date of Patent: Feb. 17, 2026

(54) INTEGRATED CHIRPED-GRATING SPECTROMETER-ON-A-CHIP

(71) Applicant: UNM RAINFOREST INNOVATIONS, Albuquerque, NM (US)

(72) Inventors: Steven R. J. Brueck, Albuquerque, NM (US); Payman Zarkesh-Ha, Albuquerque, NM (US); Alexander Neumann, Albuquerque, NM (US)

(*) Notice: Subject to any disclaimer, the term of this patent is extended or adjusted under 35 U.S.C. 154(b) by 171 days.

(21) Appl. No.: 17/777,805

(22) PCT Filed: Nov. 19, 2020

(86) PCT No.: PCT/US2020/061192
§ 371 (c)(1),
(2) Date: May 18, 2022

(87) PCT Pub. No.: WO2021/102088
PCT Pub. Date: May 27, 2021

(65) Prior Publication Data
US 2022/0412800 A1  Dec. 29, 2022

Related U.S. Application Data

(60) Provisional application No. 62/937,664, filed on Nov. 19, 2019.

(51) Int. Cl.
*G01J 3/24* (2006.01)
*G01J 3/02* (2006.01)
(Continued)

(52) U.S. Cl.
CPC ............. *G01J 3/24* (2013.01); *G01J 3/0256* (2013.01); *G01J 3/04* (2013.01); *G01J 3/1895* (2013.01); *G02B 6/42* (2013.01); *G02B 6/4215* (2013.01)

(58) Field of Classification Search
CPC ...... G01J 3/0205; G01J 3/0256; G01J 3/0259; G01J 3/0262; G01J 3/04; G01J 3/1895; G01J 3/24; G02B 6/42; G02B 6/4215
(Continued)

(56) References Cited

U.S. PATENT DOCUMENTS 5,101,459 A    3/1992  Sunagawa
5,353,273 A *  10/1994 Zavislan ................. G11B 7/124
(Continued)

FOREIGN PATENT DOCUMENTS

| JP | 2000258342 A | 9/2000 |
|---|---|---|
| WO | 2015177974 A1 | 11/2015 |
| WO | 2018217823 A1 | 11/2018 |

OTHER PUBLICATIONS

Search Report and Written Opinion dated Mar. 4, 2021 in corresponding International Application No. PCT/US2020/061192, 8 pages.
(Continued)

*Primary Examiner* — Tri T Ton
(74) *Attorney, Agent, or Firm* — MH2 Technology Law Group LLP

(57) ABSTRACT

A spectral sensor and a method for forming the spectral sensor is disclosed. The spectral sensor includes a planar waveguide on a substrate; a restriction mechanism that restricts a range of angles of incidence of light impinging onto the chirped input coupling grating; the chirped input grating formed to couple incident light into the planar waveguide, wherein the chirped input coupling grating comprises a first transverse chirp to provide a spectrally selective coupling of incident light Into the planar waveguide; a propagation region to filter out light that is not coupled into the planar waveguide; a detector array arranged on the opposite side of the propagation region from the chirped input coupling S grating to receive light coupled out
(Continued)

of the planar waveguide and produce output signals representative of the light; and an electrical circuit to readout output signals from the detector array.

13 Claims, 9 Drawing Sheets

(51) Int. Cl.
    *G01J 3/04*           (2006.01)
    *G01J 3/18*           (2006.01)
    *G02B 6/42*          (2006.01)

(58) Field of Classification Search
    USPC .......................................................... 356/328
    See application file for complete search history.

(56) References Cited

U.S. PATENT DOCUMENTS

| | | | |
|---|---|---|---|
| 5,442,169 A | | 8/1995 | Kunz |
| 5,493,393 A | * | 2/1996 | Beranek ............. G01D 5/34776 |
| | | | 356/334 |
| 9,497,380 B1 | | 11/2016 | Jannard et al. |
| 11,326,946 B2 | * | 5/2022 | Brueck .................. G01J 3/0218 |
| 2010/0165134 A1 | * | 7/2010 | Dowski, Jr. ......... G02B 13/0085 |
| | | | 257/E31.127 |
| 2015/0207290 A1 | | 7/2015 | Brueck et al. |
| 2017/0108375 A1 | | 4/2017 | Brueck et al. |
| 2018/0284563 A1 | * | 10/2018 | Register ............... G10K 11/178 |
| 2020/0049882 A1 | * | 2/2020 | Wang ...................... G01N 21/03 |

OTHER PUBLICATIONS

International Preliminary Report on Patentability dated Jun. 2, 2022 in International Application No. PCT/US2020/061192, 8 pages.
International Search Report and Written Opinion dated Aug. 23, 2018 in related International Application No. PCT/US2018/033981, 7 Pages.
International Preliminary Report on Patentability in related International Application No. PCT/US2018/033981, 6 pages.
Bao, Jie, and Moungi G. Bawendi. "A colloidal quantum dot spectrometer." Nature 523.7558 (2015): 67-70.
Benoit, Steve, et al.. "Design of chirped gratings using interferometric lithography." IEEE Photonics Journal 10.2 (2018): 1-13.
Brueck, Steven RJ. "Optical and interferometric lithography-nanotechnology enablers." Proceedings of the IEEE 93.10 (2005): 1704-1721.
Gao, Boshen, et al. "Design of flat-band superprism structures for on-chip spectroscopy." Optics express 23.5 (2015): 6491-6496.
Faraji-Dana, MohammadSadegh, et al. "Compact folded metasurface spectrometer." Nature communications 9.1 (2018): 4196.
Gan, Xuetao, et al. "A high-resolution spectrometer based on a compact planar two dimensional photonic crystal cavity array." Applied Physics Letters 100.23 (2012).
Hartmann, Wladick, et al. "Waveguide-integrated broadband spectrometer based on tailored disorder." Advanced Optical Materials 8.6 (2020): 1901602.
Hashimoto, Atsushi, et al. "Applications of infrared spectroscopy to biochemical, food, and agricultural processes." Applied Spectroscopy Reviews 43.5 (2008): 416-451.
He, Xiang, et al. "Optically pumped continuously tunable mid-IR distributed-feedback semiconductor laser." IEEE Journal of Quantum Electronics 52.10 (2016): 1-10.
Heidari, Elham, et al. "On-chip Fourier transform spectrometer on silicon-on-sapphire." Optics Letters 44.11 (2019): 2883-2886.
Horie, Yu, et al. "Wide bandwidth and high resolution planar filter array based on DBR-metasurface-DBR structures." Optics express 24.11 (2016): 11677-11682.

Inoue, M., et al. "Validation of XCH 4 derived from SWIR spectra of GOSAT TANSO-FTS with aircraft measurement data." Atmospheric Measurement Techniques 7.9 (2014): 2987-3005.
Jang, Woo-Yong, et al. "Experimental demonstration of adaptive infrared multispectral imaging using plasmonic filter array." Scientific reports 6.1 (2016): 34876.
Khan, Saara A., et al. "Colloidal quantum dots for cost-effective, miniaturized, and simple spectrometers." Clinical Chemistry 62.4 (2016): 548-550.
Kurokawa, Umpei, Byung Il Choi, and Cheng-Chun Chang. "Filter-based miniature spectrometers: spectrum reconstruction using adaptive regularization." IEEE Sensors Journal 11.7 (2010): 1556-1563.
Kurosu, Thomas P., et al. "Preliminary results for HCHO and BrO from the EOS-aura ozone monitoring instrument." Passive optical remote sensing of the atmosphere and clouds IV. Vol. 5652. SPIE, 2004.
Nezhadbadeh, Shima, et al. "Chirped-grating spectrometer-on-a-chip." Optics Express 28.17 (2020): 24501-24510.
Micó, Gloria, et al. "Integrated optic sensing spectrometer: Concept and design." Sensors 19.5 (2019): 1018.
Momeni, Babak, et al. "Integrated photonic crystal spectrometers for sensing applications." Optics communications 282.15 (2009): 3168-3171.
Ozaki, Yukihiro. "Near-infrared spectroscopy—Its versatility in analytical chemistry." Analytical sciences 28.6 (2012): 545-563.
Pervez, Nadia K., et al. "Photonic crystal spectrometer." Optics express 18.8 (2010): 8277-8285.
Podmore, Hugh, et al. "Demonstration of a compressive-sensing Fourier-transform on-chip spectrometer." Optics letters 42.7 (2017): 1440-1443.
Pruessner, Marcel W., Todd H. Stievater, and William S. Rabinovich. "Integrated waveguide Fabry-Perot microcavities with silicon/air Bragg mirrors." Optics letters 32.5 (2007): 533-535.
Rahnama, Abdullah, et al. "Ultracompact Lens-Less "Spectrometer in Fiber" Based on Chirped Filament-Array Gratings." Advanced Photonics Research 1.2 (2020): 2000026.
Sabry, Yasser M., et al. "Monolithic silicon-micromachined free-space optical interferometers onchip." Laser & Photonics Reviews 9.1 (2015): 1-24.
Souza, Mario CMM, et al. "Fourier transform spectrometer on silicon with thermo-optic non-linearity and dispersion correction." Nature communications 9.1 (2018): 665.
Tittl, Andreas, et al. "Imaging-based molecular barcoding with pixelated dielectric metasurfaces." Science 360.6393 (2018): 1105-1109.
Tsur, Yuval, and Ady Arie. "On-chip plasmonic spectrometer." Optics Letters 41.15 (2016): 3523-3526.
Wang, Zhu, et al. "Single-shot on-chip spectral sensors based on photonic crystal slabs." Nature communications 10.1 (2019): 1020.
Xie, Shengjie, et al. "Silicon nitride/silicon dioxide echelle grating spectrometer for operation near 1.55 um." IEEE Photonics Journal 10.6 (2018): 1-7.
Yang, Zongyin, et al. "Miniaturization of optical spectrometers." Science 371.6528 (2021): eabe0722.
Yu, Kyoungsik, et al. "Micromachined Fourier transform spectrometer on silicon optical bench platform." Sensors and Actuators A: Physical 130 (2006): 523-530.
Zhang, Lichao, et al. "Research progress on on-chip Fourier transform spectrometer." Laser & Photonics Reviews 15.9 (2021): 2100016.
Zhu, Alexander Y., et al. "Ultra-compact visible chiral spectrometer with meta-lenses." Apl Photonics 2.3 (2017).
Futurrex, Inc. "Negative Etch Resists."Online: https://futurrex.com/en/products/negative-photoresists/negative-etch-resists.html.
Ansys Lumerical FDTD: Simulation of Photonic Components. Online: https://www.lumerical.com.
KK, Hamamatsu Photonics. "CMOS Linear Image Sensors." (2024).
Ebermann, Martin, et al. "Tunable MEMS Fabry-Perot filters for infrared microspectrometers: a review." MOEMS and miniaturized systems XV 9760 (2016): 64-83.

\* cited by examiner

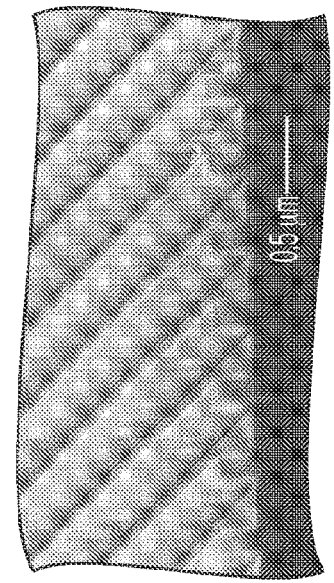
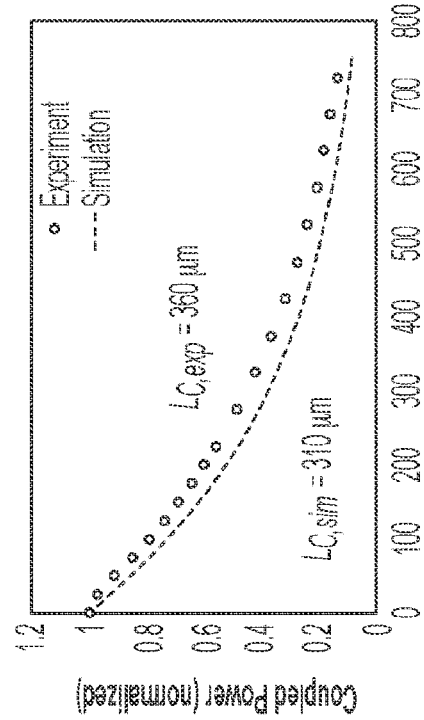
FIG. 1A
FIG. 1B
FIG. 1C
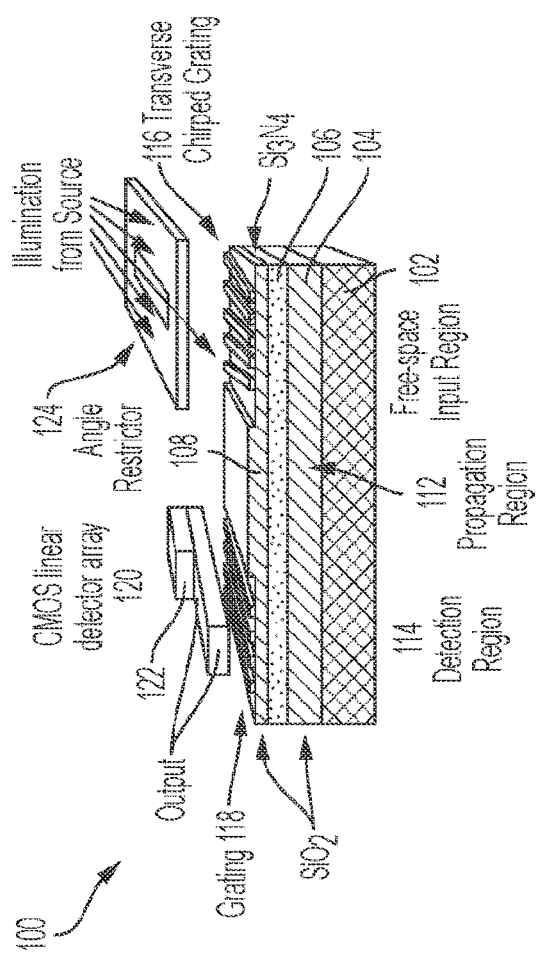
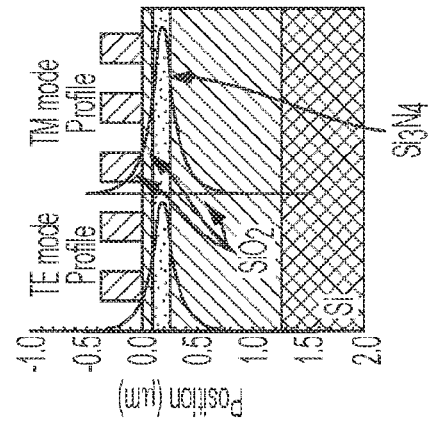
FIG. 1D

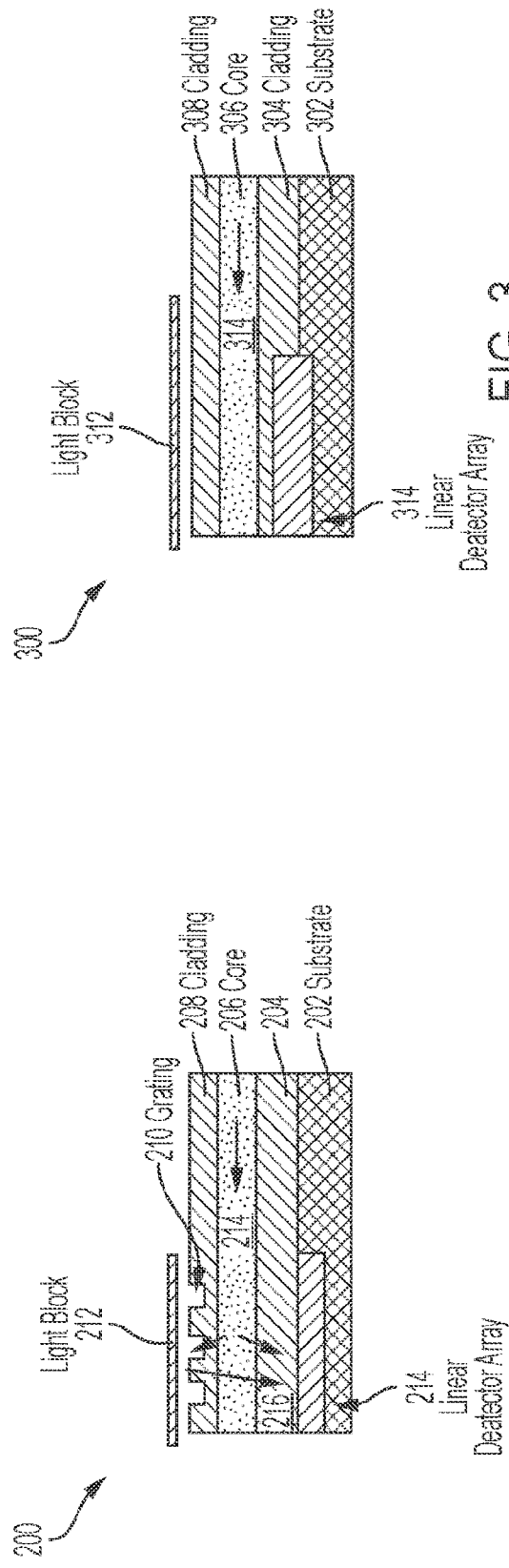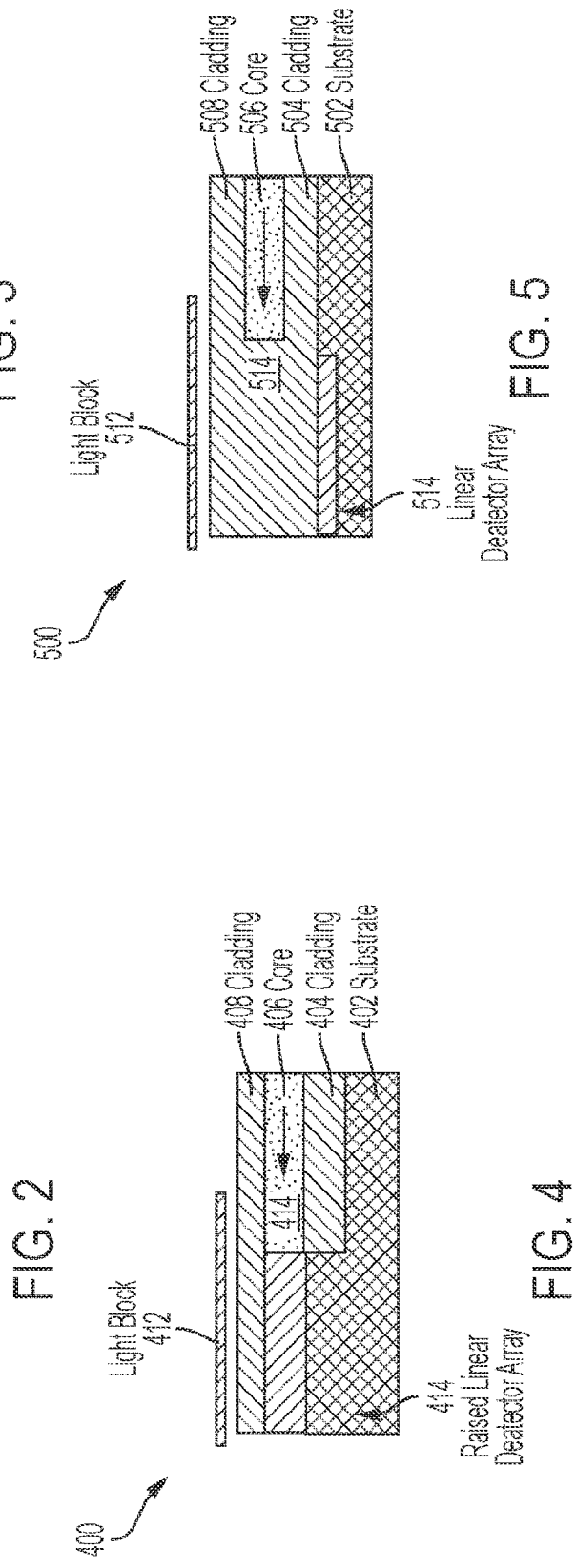

INTEGRATED CHIRPED-GRATING SPECTROMETER-ON-A-CHIP

CROSS-REFERENCE TO RELATED APPLICATIONS

This application is a U.S. National Phase application of PCT/US2020/061192 filed Nov. 19, 2020, which claims priority to U.S. Provisional Application No. 62/937,664 filed on Nov. 19, 2019, the disclosures of which are incorporated by reference herein in their entireties.

GOVERNMENT RIGHTS

This disclosure was made with Government support under Contract No. EEC0812056 awarded by the National Science Foundation. The Government has certain rights in the invention.

FIELD

The present teachings generally relate to spectrometers, and in particular, to an integrated chirped-grating spectrometer-on-a-chip.

BACKGROUND

An integrated optical spectrometer is an essential component for many lab-on-a-chip applications. Two major directions for integrated spectrometers are: fiber-input applications that are aimed mainly at telecommunication networks operating at 1300- to 1600-nm wavelengths, or at evanescent-field spectroscopy of adsorbates where the optics is confined to waveguides; and free-space input applications for more general spectroscopic application. In most cases, telecommunication network demonstrations require high resolution lithography and trimming to define the wavelength response of Mach-Zehnder interferometers, array waveguides, echelle gratings, or ring resonators. Free space input devices have many spectroscopic applications including manufacturing control, food safety, and medical diagnostics. Traditional grating approaches have been miniaturized, but are resolution limited due to the inverse relationship between path length and resolution for free space propagation. Multiplexed and MEMS-based Fabry-Pérot and Fabry-Perot resonators have also been investigated, as have arrays of tunable filters based on thin-films and on quantum dots, photonic crystal thin films both in transmission and in-plane propagation, plasmonics, and metasurfaces. Difficulties associated with all of these approaches in varying degrees include: a) a limited spectral resolution for individual pixels, requiring signal processing to deconvolve relatively broad spectral responses (for the dielectric filter, Fabry-Pérot, photonic crystal, plasmonic, and quantum dot approaches) making the resolution dependent on the signal-to-noise ratio; and b) a fabrication process that increases in difficulty as the number of pixels is increased. Mach-Zehnder interferometers have the necessary resolution, but are not amenable to free-space inputs, require local trimming of the resonances, are temperature sensitive, space intensive and therefore limited in density, and are not CMOS compatible since they require a material such as $LiNbO_3$ with a second-order nonlinearity. Despite this intensive effort, a high-resolution, compact, volume manufacturable, CMOS compatible, free-space-input lab-on-a-chip spectrometer remains an elusive goal.

SUMMARY

In accordance with examples of the present disclosure, a spectral sensor is disclosed. The spectral sensor comprises a planar waveguide on a substrate; a restriction mechanism that restricts a range of angles of incidence of light impinging onto the chirped input coupling grating; the chirped input grating formed to couple incident light into the planar waveguide, wherein the chirped input coupling grating comprises a first transverse chirp to provide a spectrally selective coupling of incident light into the planar waveguide; a propagation region to filter out light that is not coupled into the planar waveguide; a detector array arranged on the opposite side of the propagation region from the chirped input coupling grating to receive light coupled out of the planar waveguide and produce output signals representative of the light; and an electrical circuit to readout output signals from the detector array.

Various additional features can be included in the spectral sensor including one or more of the following. The spectral sensor can further comprise an output grating that couples the light from the planar waveguide to the detector array. The output grating can comprise a second transverse chirp. The second transverse chirp can have a different chirp period than the first transverse chirp. The chirped input coupling grating comprises a variation of the grating period along a length of the grating, and wherein a spectral composition of light coupled into the waveguide varies as a result of variation of the grating period along the length of the grating. The spectral sensor can further comprise a light block to shield the detector array from incident light scattered into the detector array without coupling into the planar waveguide. The planar waveguide comprises a bottom cladding, a core, and a top cladding. The top and bottom claddings are comprised of silicon dioxide and the waveguide core is comprised of silicon nitride. An output coupling grating is fabricated in the detection region and a detector array is arranged to absorb some of the power radiated away from the substrate. Additional electronics can be fabricated along with the detector array for readout of the detection signals. The detector array is fabricated in the substrate before the planar waveguide is formed and arranged to absorb some of the power passing through the propagation region. The detector array is fabricated in a different semiconductor material from that of the substrate that is epitaxially grown on the substrate. The detector array is fabricated in a different material system from that of the substrate and is wafer bonded to the substrate. The detector array is electrically connected to electronics fabricated in the substrate that generates one or more electrical signals corresponding to a spectrum of the incident light which is incident at a fixed angle. The spectral sensor can further comprise electronics fabricated in the substrate to receive and condition the electrical signals from the detector array to provide a spectrum of the incident light.

In accordance with examples of the present disclosure, a method of forming a spectral sensor is disclosed. The method of forming the spectral sensor comprises providing a substrate; forming a detector array on the substrate; forming a planar waveguide on the substrate; forming a chirped input grating to couple incident light into the planar waveguide, wherein the chirped input coupling grating comprises a first transverse chirp to provide a spectrally selective coupling of incident light into the planar waveguide; forming a propagation region to filter out light that is not coupled into the planar waveguide; forming a restriction mechanism that restricts a range of angles of incidence of light impinging onto the chirped input coupling grating; and forming an electrical circuit to readout output signals from the detector array.

Various additional features can be added to the method of forming the spectral sensor including one or more of the following. The method can further comprise forming an output grating that couples the light from the planar waveguide to the detector array. The output grating can comprise a second transverse chip. The second transverse chirp can have a different chirp period than the first transverse chirp. The chirped input coupling grating comprises a variation of the grating period along a length of the grating, and wherein a spectral composition of light coupled into the waveguide varies as a result of variation of the grating period along the length of the grating. The method can further comprise forming a light block to shield the detector array from incident light scattered into the detector array that is not coupled into the planar waveguide. The detector array can be fabricated in the substrate and arranged to intercept the modal fields of light propagating in the waveguide in the detection region. The detector array and associated electronics is fabricated in a separate chip, is mounted atop the waveguide, and a grating is fabricated near the waveguide to couple light propagating in the waveguide to the detector array. The detector array can be fabricated in a semiconductor material epitaxially grown on the substrate and arranged to intercept the modal fields of light propagating in the waveguide in the detection region. The detector array can be fabricated in a semiconductor material that is wafer bonded to the substrate and arranged to intercept the modal fields of light propagating in the waveguide in the detection region.

DESCRIPTION OF THE FIGURES

FIG. 1A shows the plenoptic spectrometer according to examples of the present disclosure.

FIG. 1B shows a SEM of a small region of the transversely chirped grating etched into the upper $SiO_2$ waveguide cladding (450 nm thick) according to examples of the present disclosure.

FIG. 1C shows waveguide structure and mode profiles (bottom oxide 1 μm thick; waveguide core 160 nm; top oxide cladding before grating etch 450 nm) according to examples of the present disclosure.

FID. 1D shows experiment and modeling for TE coupling length evaluated by measuring the decay of the power transmitted to the detector region vs. position for a 50 μm diameter Gaussian spot scanned away from the collection grating/propagation region interface at 660 nm; waveguide parameters: bottom $SiO_2$—1 μm thick; $Si_3N_4$—160 nm thick; top $SiO_2$ cladding—100 nm; $SiO_2$ grating height—200 nm according to examples of the present disclosure.

FIG. 2 shows another detection arrangement for a plenoptic spectrometer according to examples of the present disclosure.

FIG. 3 shows another detection arrangement for a plenoptic spectrometer according to examples of the present disclosure.

FIG. 4 shows another detection arrangement for a plenoptic spectrometer according to examples of the present disclosure.

FIG. 5 shows another detection arrangement for a plenoptic spectrometer according to examples of the present disclosure.

Figure 6A:
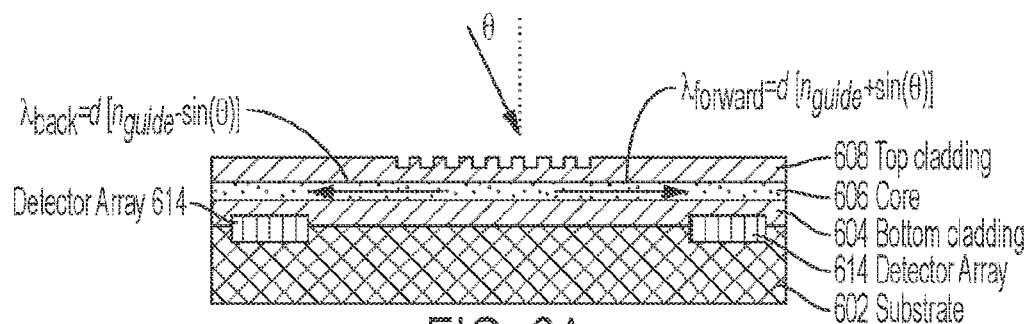
Figure 6B:
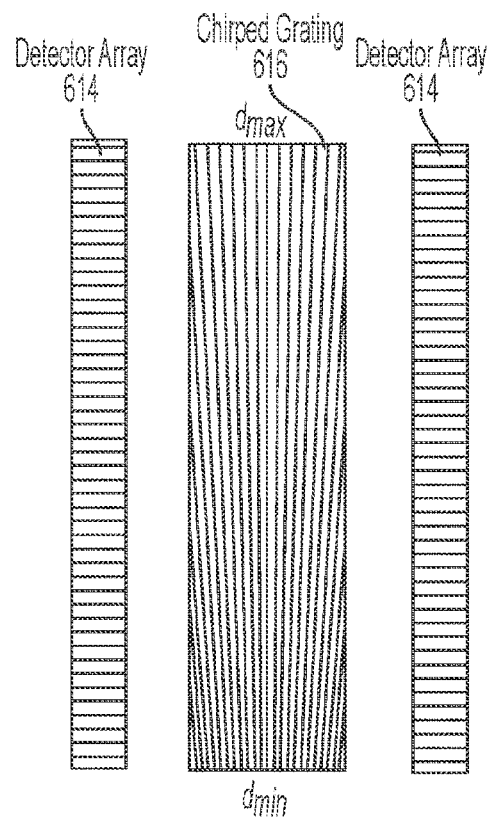

FIG. 6A shows a side view and FIG. 6B a top view of an arrangement that uses two detector arrays and a single chirped grating according to examples of the present disclosure.

Figure 7:
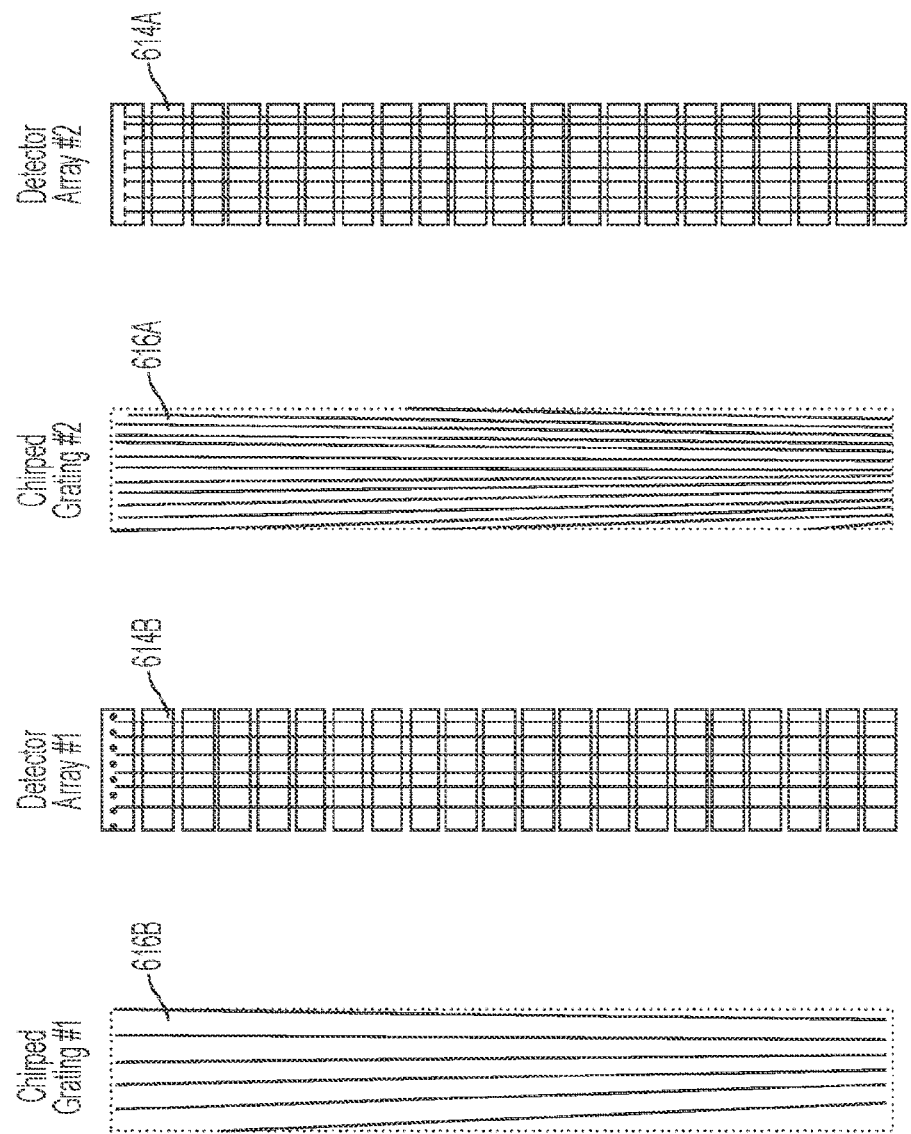

FIG. 7 shows an arrangement for a chirped grating spectrometer that utilizes two chirped gratings and two detector arrays.

Figure 8:
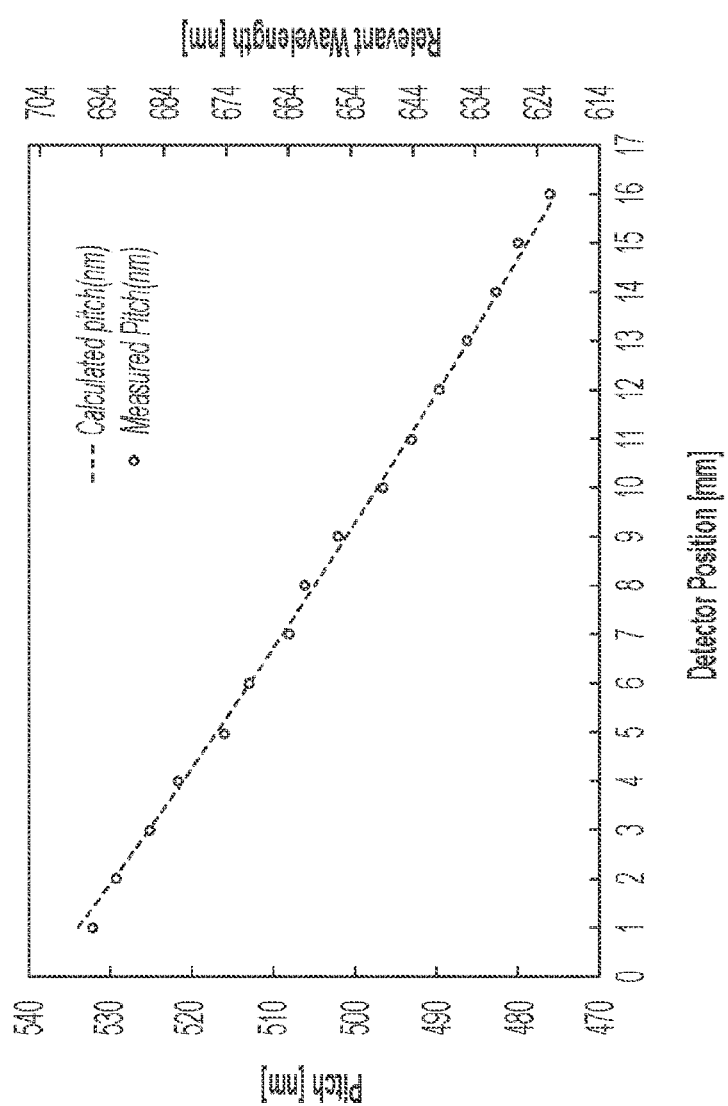

FIG. 8 shows a plot of the measured grating period across the collection area compared with model calculation according to examples of the present disclosure. The corresponding coupling wavelengths for TE polarization at an incident angle of θ=27° are shown on the right axis.

Figure 9A:
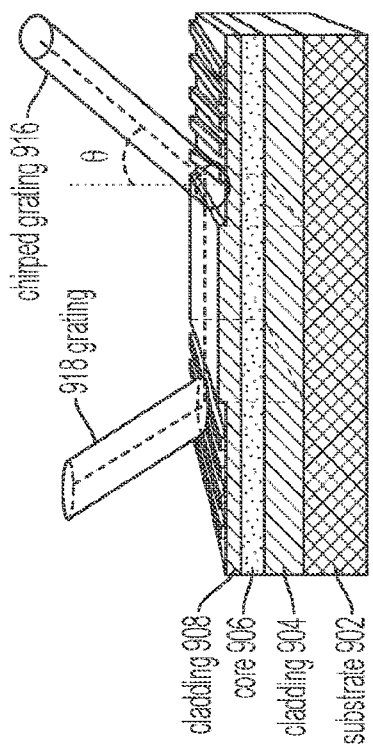

FIG. 9A shows the spectrally sensitive portion of the spectrometer according to examples of the present disclosure.

Figure 9B:
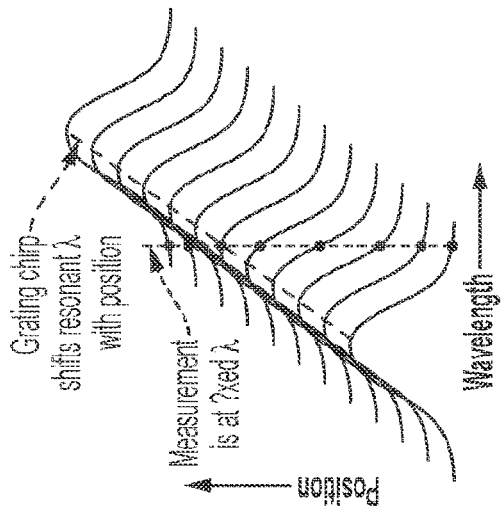

FIG. 9B shows a schematic of the plenoptic spectrometer principle of operation for narrow band illumination at a fixed angle according to examples of the present disclosure. At the detection side, the light is shown diffracted out of the waveguide into free space above the chip.

Figure 9C:
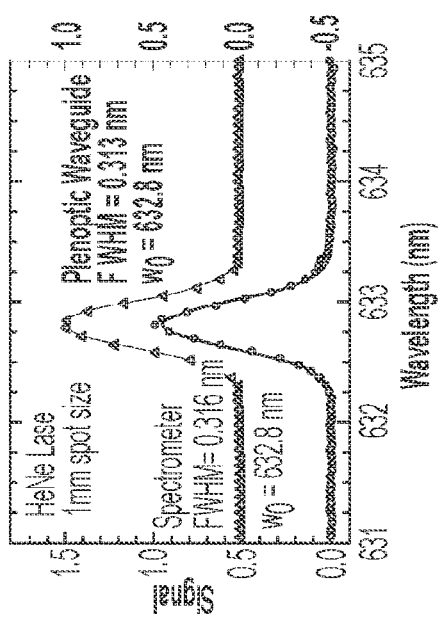

FIG. 9C shows the spectral measurement for a TE-polarized HeNe laser with an intrinsic linewidth much lower than the plenoptic spectrometer resolution limits according to examples of the present disclosure. Also shown is the result for a laboratory spectrometer for comparison.

Figure 9D:
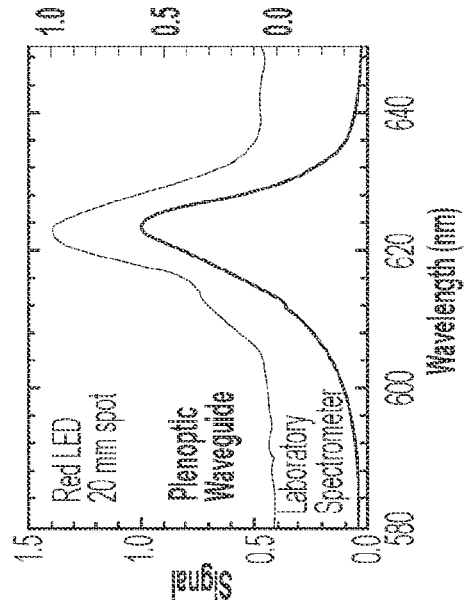

FIG. 9D shows the result for a red LED along with a polarizer set to transmit TE polarization along with a comparison with the laboratory-scale spectrometer according to examples of the present disclosure.

Figure 10:
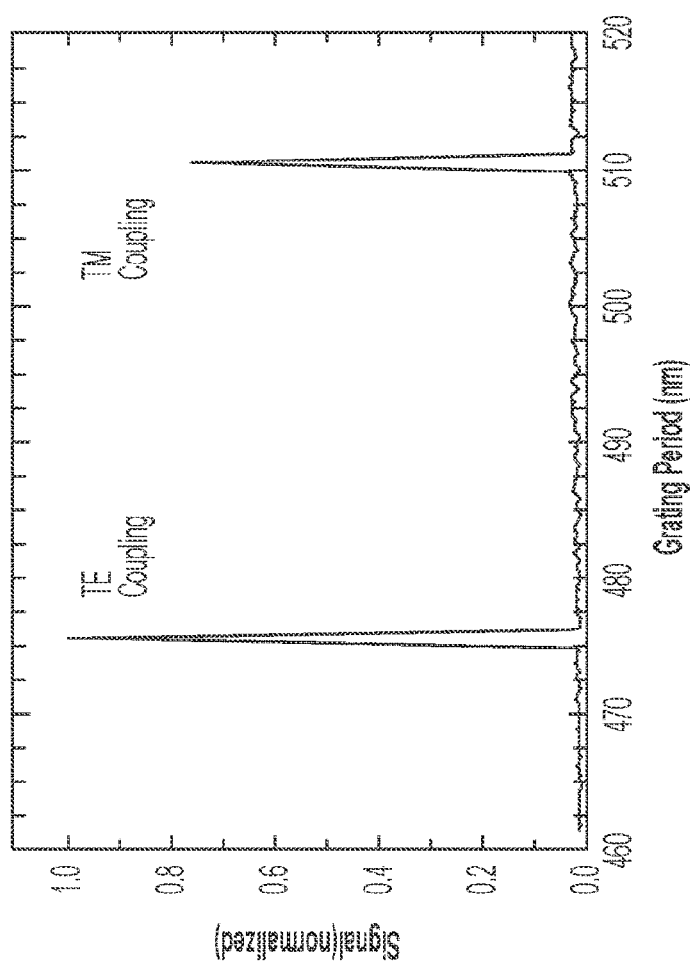

FIG. 10 shows a plot of a normalized signal versus grating period for light incident with a polarization that includes both TE and TM components. Because the effective indices differ for TE and TM polarization, the coupling angles are different for the two polarizations according to examples of the present disclosure. Result for a 660 nm.

Figure 11:
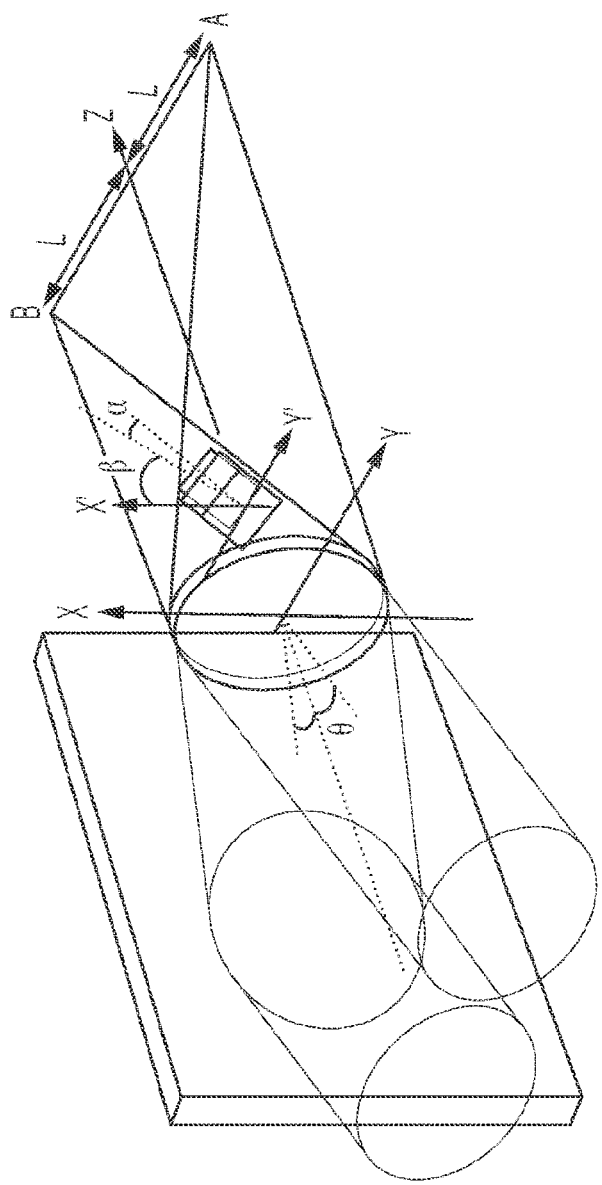

FIG. 11 shows a schematic of the interferometric lithography arrangement used to pattern the chirped grating [from Ref. Error! Bookmark not defined.].

Figure 12:
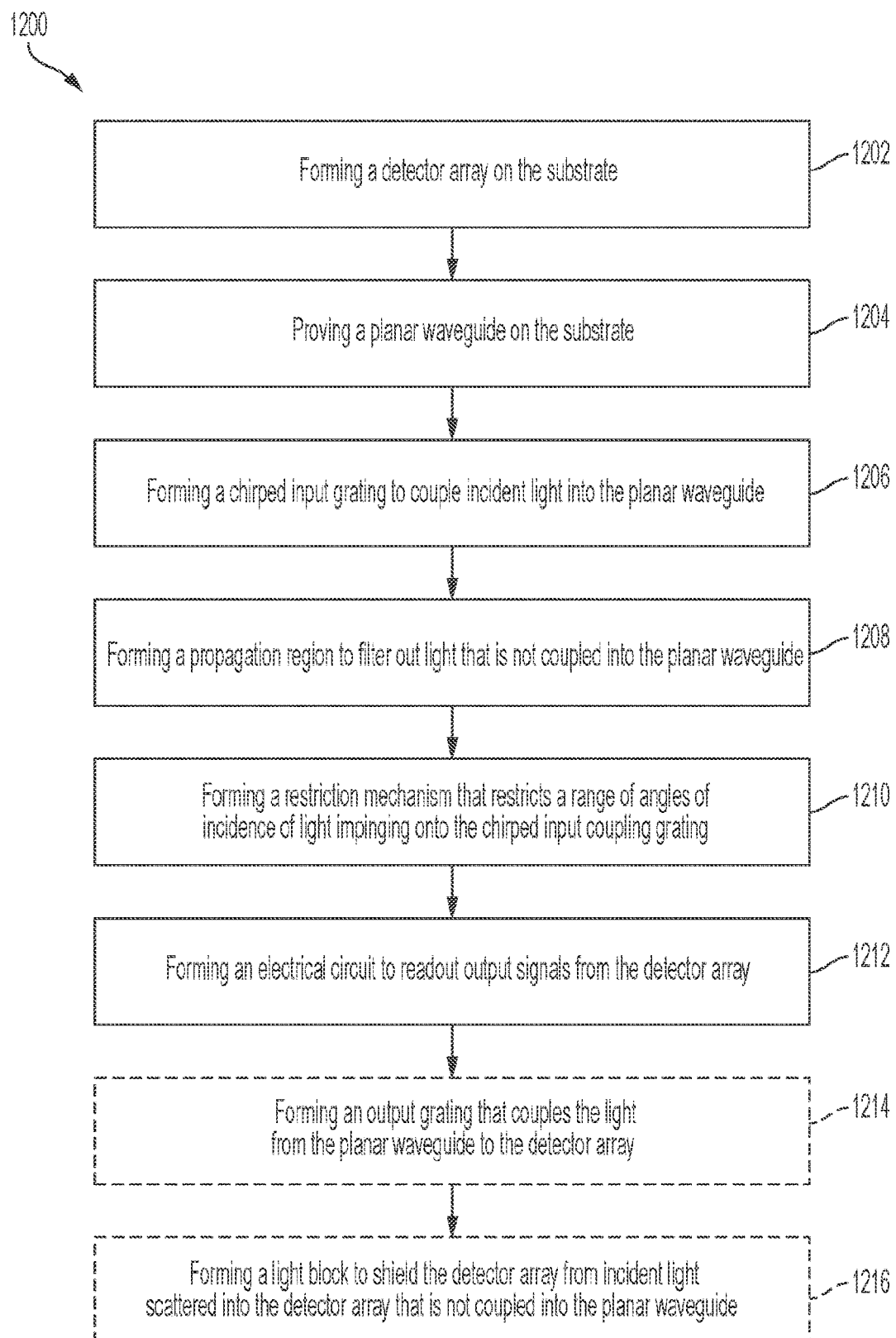

FIG. 12 shows a method for forming a spectral sensor according to examples of the present disclosure.

DETAILED DESCRIPTION

According to examples of the present disclosure, an on-chip spectrometer is disclosed, readily integrable with CMOS electronics, capable of covering a wide spectral range of ~300- to 1000-nm limited only by the wavelength response of Si CMOS detectors. The structure is comprised of a $SiO_2/Si_3N_4/SiO_2$ waveguide atop a silicon substrate. A chirped grating is fabricated, in a single-step lithography process, on a portion of the waveguide to provide angle and wavelength dependent coupling to the guided mode. The spectral and angular information is encoded in the spatial dependence of the grating period. A uniform pitch grating area, separated from the collection area by an unpatterned propagation region, provides the out-coupling to a CMOS detector array. In a first proof-of-principle experiment, a resolution of 0.3 nm at 633 nm is demonstrated without the need for any application of signal processing deconvolution. This on-chip spectrometer concept will cost effectively enable a broad range of applications that are beyond the reach of current single chip spectroscopic technologies.

It is readily understood that this concept can be extended to other wavelength ranges, including specifically the near-infrared including the technologically important telecommunications bands with the addition of different detector materials, which could be integrated either atop or below the waveguide structure.

Further extension of the wavelength response can be accommodated by changing both the waveguide and the detection materials to allow for infrared transmission and detection.

According to examples of the present disclosure, an integrated, lab-on-a-chip spectrometer with a spectral resolution based on free-space coupling to a waveguide atop a silicon wafer using a transversely chirped grating is disclosed. The chirped grating provides the dispersion that leads to a high-resolution, compact, fully CMOS-compatible spectrometer. Since the coupling is sensitive to the wavelength, direction and polarization of incident plane waves, this is a plenoptic detection concept. Light is analyzed in a single, monolithic component which enables realizing a high-resolution portable spectrometer with an extremely compact footprint. Importantly, only a single lithography step, well within current optical lithographic capabilities, is needed independent of the number of detector elements. All of the fabrication steps and waveguide materials are CMOS compatible which will lead to cost-effective volume manufacturing. FIG. 1A shows the plenoptic spectrometer 100 according to examples of the present disclosure. Plenoptic spectrometer 100 comprises a substrate 102, first cladding layer 104 that is formed on a top surface of substrate layer 102, core layer 106 that is formed on a top surface of first cladding layer 104, and second cladding layer 108 that is formed on a top surface of core layer 106. Substrate 102 can be composed of silicon. Transversely chirped input coupling grating 116 is formed in second cladding layer 108. Alternate positions for this coupling grating will depend on the fabrication technology; the requirement is that the grating exhibit index of refraction contrast between the teeth and spaces of the grating and be located within the modal fields to allow the coupling. Transversely chirped input coupling grating 116 comprises a variation of the grating period along a length of the grating. A period of transversely chirped input coupling grating 116 is a function of position, both in a transverse and a longitudinal direction. For the fabrication technology discussed below there is a major variation in the transverse direction and a minor variation in the longitudinal direction. There are alternate fabrication arrangements that exhibit only a transverse variation, for example using e-beam fabricated masks in contemporary wafer lithography tools. A period of the grating lines at a first location along the transverse input coupling grating 116 is different than a period of the grating lines at a second location, separated from the first location, of transversely chirped input coupling grating. In this manner, plenoptic spectrometer 100 can be configured to couple into the waveguide incoming light at a fixed angle of incidence of various wavelengths at different locations along the transversely chirped input coupling grating 116, providing a spectroscopic functionality. Transversely chirped input coupling grating 116 provides a spectrally selective coupling of the incident light into the planar waveguide.

Output coupling grating 118 is formed on a top surface of second cladding layer 108. Detector array 120, such as a linear detector array, is formed on a top surface of second cladding layer 108 and above output coupling grating 118. In some examples, light blocking element (not shown, but shown in the examples of FIGS. 2-5 is arranged over output coupling grating 118 to reduce unwanted light from entering plenoptic spectrometer 100 and being detected by detector array 120. In operation, light enters plenoptic spectrometer 100 free-space input region 110 at transverse chirped input grating 118 at an approximately fixed angle of incidence, propagates across core layer 106 in propagation region 112, and is detected by detector array 120 at detection region 114. Output signals from detector array 120 are received by electrical output controller 122 to readout the output signals.

Because grating coupling depends on both the wavelength and the angle of incidence of light input to the device, an additional filtering structure, such as a restrictor 124 that restricts the range of input angles can be used to resolve angular-wavelength degeneracy of the plenoptic spectrometer 100. In other words, the restrictor comprises an aperture that restricts angular acceptance of the light incident to the transversely chirped input coupling grating 116. In an embodiment, restrictor comprises a beam block having an appropriate aperture and disposed an appropriate distance above transversely chirped input coupling grating 116. The light aperture reduces the angular spread of the light incident on a particular device element, thus eliminating the degeneracy. Although not shown in the examples of FIGS. 2-6A, each of the sensors of FIGS. 2-6A can include a restrictor, such as restrictor 124, as discussed above.

In some embodiments, as discussed in more detail below, the detector array is fabricated in the silicon substrate before the waveguide layers are deposited.

The waveguide structure is comprised of a $SiO_2/Si_3N_4/SiO_2$ waveguide on top of a silicon wafer. Grating regions are fabricated into the top cladding of the waveguide as shown in FIG. 1A. The coupling length, e.g. the distance over which the power coupled into the waveguide saturates for a uniform illumination as a result of the balance between input coupling and re-radiation into free space, depends on the material of the grating and its position relative to the modal fields. Alternatively, the grating regions can be formed in the bottom cladding or in additional layers such as, for example, a metal layer provided as part of the CMOS process flow. The input light is incident over a narrow, approximately fixed, angular range on a transversely chirped grating collection area; the light coupled into the waveguide propagates across the grating free region and is out-coupled at the detection region. The narrow angular range is controlled by the use of an aperture above the integrated plenoptic spectrometer or by additional external optics. Because of the variation of the grating pitch transverse to the grating lines (i.e. the grating lines are splayed out with different periods along the length of the grating), different wavelengths of light are coupled into the waveguide at different lateral positions across the collection area. Guided light is then out-coupled with a second (variable or fixed pitch) grating in the detection area, separated from the collection area by a sufficient distance to allow discrimination against any non-propagating scattered light in the waveguide, and directed to an array of photodiodes arranged in the second grating region. Shielding of the detector array is provided to eliminate any scattered light that does not propagate through the waveguide. Spectral information is provided by the angle of incidence of the light and the local period of the transversely chirped grating, which is fabricated in a single lithography step, independent of the number of channels.

For initial proof-of-principle experiments, a commercial, 1D CMOS detection array was used with a distance of ~2 mm between the grating out-coupler and the detector array. In future iterations, these detectors can be integrated into the underlying silicon, resulting in a fully integrated spectrometer on a chip. Varying the input angle of the light varies the measurement spectral range. This will result in an inexpensive spectrometer on chip, with adjustable resolution and spectral coverage controlled by the grating chirp and the input angle.

FIG. 1A shows a schematic of the plenoptic spectrometer structure that comprises a transversely chirped grating collection region; a waveguide propagation and filtering region; and a detection region. For this proof-of-principle experiment the detector is a linear CMOS detector array on a separate chip. FIG. 1B shows a scanning electron microscope (SEM) image of a small region of the transversely chirped grating etched into the upper $SiO_2$ waveguide cladding (450 nm thick). FIG. 1C shows the waveguide structure and mode profiles assuming a full thickness cladding (bottom oxide 1 μm thick; waveguide core 160 nm; top oxide cladding before grating etch 450 nm). Note that the mode extends into the grating region providing coupling but is separated from the silicon substrate to avoid propagation losses.

FIG. 1D shows experiment and modeling for TE coupling length evaluated by measuring the decay of the power transmitted to the detector region vs. position for a 50 μm diameter Gaussian spot scanned away from the collection grating/propagation region interface at 660 nm; waveguide parameters: bottom $SiO_2$—1 μm thick; $Si_3N_4$—160 nm thick; top $SiO_2$ cladding—100 nm; $SiO_2$ grating height— 200 nm.

The on-chip plenoptic spectrometer is based on a three-layer slab waveguide deposited on a silicon substrate. The waveguide stack comprises a 1-μm thick bottom $SiO_2$ cladding formed by wet thermal oxidation of a silicon wafer ($n_{bSiO_2}$=1.46); a 160 nm thick $Si_3N_4$ ($n_{Si_3N_4}$=2.014) core region deposited by low pressure chemical vapor deposition on top of the bottom cladding; and a 450-nm thick $SiO_2$ top cladding ($n_{tSiO_2}$=1.45) deposited using dielectric evaporation. The bottom oxide serves several functions: 1) it is thick enough so that the waveguide mode does not extend into the silicon, resulting in low loss propagation of the waveguide mode; 2) the $SiO_2$/Si interface reflects a portion of any incident light transmitted or forward diffracted by the grating, the path length can be adjusted for constructive interference between the light coupled into the waveguide in the forward and backward paths for a specific wavelength/incident angle range. The thickness of the core region was chosen to allow only a single transverse mode; however, there remains a polarization diversity with both TE and TM zero-order transverse modes. The mode profiles in the fully clad region (e.g. no grating) are shown in FIG. 1C. The TE mode is slightly better confined to the waveguide and consequently has a higher modal index, closer to that of the core, of $n_{eff}^{TE}$=1.765 while $n_{eff}^{TM}$=1.642 (both at a wavelength of 660 nm). The gratings are etched 350-nm deep into the 450-nm thick top cladding. The tooth height and the initial top cladding thickness together control the coupling length. FDTD modeling was used to establish the parameters. The results of experiment and model for the coupling length at λ=660 nm is shown in FIG. 1D). Note that this coupling length, $L_C$, also defines the collection area width for the incident light. The power coupled into the waveguide saturates at this distance due to the detailed balance between input coupling and re-radiation back into the free-space modes.

The spectrometer design incorporates two grating areas separated by a propagation region. A chirped collection area to receive the incident light and to couple a varying spectral portion into the waveguide as a function of the position across the coupling area and a detection region where this spectrally selected slice is coupled into the photodetector. The measurement reported in FIG. 1D) used a chip with a fixed period coupling-region grating (380 nm pitch; identical to the grating in the detection region) rather than the chirped grating; an incident wave was launched using a focused laser beam (50 μm diameter Gaussian) in the collection region and moving this laser spot away from the coupling grating—propagation region interface while monitoring the waveguide power reaching the detection region.. The grating coupling length is calculated to be $L_C$=310 μm for TE polarization using an FDTD Solver which is in substantial agreement with the measurement result. The simulation was repeated for the decay of the power in the waveguide as it propagates under the output grating; as expected the results were the same for both simulations.

FIG. 2 shows an alternate configuration of a detection region fabricated in the silicon substrate before the formation of the waveguide according to examples of the present disclosure. The embodiment comprises substrate layer 202, first cladding layer 204 that is formed on a top surface of substrate layer 202, core layer 206 that is formed on a top surface of first cladding layer 204, and second cladding layer 208 that is formed on a top surface of core layer 206. Substrate layer 202 can be composed of silicon. Although not shown in FIG. 2, a transverse chirped input coupling grating is formed in second cladding layer 208 as shown in FIG. 1A. Output coupling grating 210 is formed on a top surface of second cladding layer 208. Detector array 214, such as a linear detector array, is formed on a top surface of substrate layer 202 and below output coupling grating 210. In some examples, light blocking element 212 is arranged over output coupling grating 210 to reduce unwanted light from entering plenoptic spectrometer 200 and being detected by detector array 214. Plenoptic spectrometer 200 operates by coupling incoming radiation 214 to core layer 206 through the chirped input coupling grating, through first cladding layer 204, and then onto detector array 214 by output coupling grating 210. Depending on the anticipated signal levels, detector array 214 can be either PIN devices or avalanche photodiodes, fabricated using well-known techniques. This detector array, along with local readout electronics, can be fabricated before the waveguide layers are added. Additional remote electronics are used for readout of detector array 214.

FIG. 3 shows an alternate configuration of the detector region of the plenoptic spectrometer 300 where the detector array is raised from the substrate into the bottom waveguide cladding, according to examples of the present disclosure. Plenoptic spectrometer 300 comprises substrate layer 302, first cladding layer 304 that is formed on a top surface of substrate layer 302, core layer 306 that is formed on a top surface of first cladding layer 304, and second cladding layer 308 that is formed on a top surface of core layer 306. Substrate layer 302 can be composed of silicon. Although not shown in FIG. 3, a transverse chirped input coupling grating is formed in second cladding layer 308 as shown in FIG. 1A. Detector array 314, such as a linear detector array, is formed on a bottom of first cladding layer 304. In some examples, light blocking element 312 is arranged over detector array 314 to reduce unwanted light from entering directly impinging on detector array 314. Plenoptic spectrometer 300 operates by coupling incoming radiation 314 to core layer 306 through the transversely chirped input coupling grating, and then onto detector array 314. Depending on the anticipated signal levels, detector array 314 can be either PIN devices or avalanche photodiodes, fabricated using well-known techniques. These detector can be fabricated before the waveguide layers are added. Additional electronics are used for readout of detector array 314. By adjusting the distance between the top of detector array 314 and core layer 306 of the waveguide near-field coupling is achieved with the tail of the waveguide mode extending to and being absorbed by the detector material without the use of an output grating. One advantage of this example is that the back reflection into the waveguide can be controlled by adjusting the distance of the detector from the waveguide core and the detector length along the propagation direction.

In one embodiment the detector array could be a PIN detector fabricated in the substrate material. In another embodiment the detector array could be an avalanche photodiode array fabricated in the substrate material. In a third embodiment, the material of the detector array could be another semiconductor, such as Ge, GeSi, or III-V material such as GaAs or InGaAsP, epitaxially grown onto the substrate. In a fourth embodiment, the detector material could be bonded to the substrate by well-known techniques, allow flexibility in the detector spectral characteristics.

FIG. 4 shows an alternate configuration of the detector region of the plenoptic spectrometer 400 where the detector array is raised to occupy the core region of the waveguide, according to examples of the present disclosure. Plenoptic spectrometer 400 comprises substrate layer 402, first cladding layer 404 that is formed on a top surface of substrate layer 402, core layer 406 that is formed on a top surface of first cladding layer 404, and second cladding layer 408 that is formed on a top surface of core layer 406. Substrate layer 402 can be composed of silicon. Although not shown in FIG. 4, a transverse chirped input coupling grating is formed in second cladding layer 408 as shown in FIG. 1A. Detector array 414, such as a linear detector array, is raised to occupy a portion of core layer 406. In some examples, light blocking element 412 is arranged over detector array 414 to reduce unwanted light from entering plenoptic spectrometer 400 and directly impinging on detector array 414. Plenoptic spectrometer 400 operates by coupling incoming radiation 414 to core layer 406 through the chirped input coupling grating, and then onto detector array 414. Depending on the anticipated signal levels, detector array 414 can be either PIN devices or avalanche photodiodes, fabricated using well-known techniques. These detector can be fabricated before the waveguide layers were added. Additional electronics are used for readout of detector array 414. One possible disadvantage of this example is the degree of reflection due to the abrupt termination of the waveguide with a higher refractive index material. An advantage is that the detector element can be made very compact as a result of the high absorption in the semiconductor material.

In one embodiment the detector array could be a PIN detector fabricated in the substrate material. In another embodiment the detector array could be an avalanche photodiode array fabricated in the substrate material. In a third embodiment, the material of the detector array could be another semiconductor, such as Ge, GeSi, or III-V material such as GaAs or InGaAsP, epitaxially grown onto the substrate. In a fourth embodiment, the detector material could be bonded to the substrate by well-known techniques, allow flexibility in the detector spectral characteristics.

FIG. 5 shows an alternate configuration of the detector region of the plenoptic spectrometer 500 where the waveguide core is removed in the detection region and the energy in the waveguide mode is partially radiated and reaches the detectors, according to examples of the present disclosure. This example may have additional crosstalk between adjacent detectors as a result of the unconstrained propagation of the power radiated from the waveguide into the cladding region. Plenoptic spectrometer 500 comprises substrate layer 502, first cladding layer 504 that is formed on a top surface of substrate layer 502, core layer 506 that is formed on a top surface of first cladding layer 504, and second cladding layer 508 that is formed on a top surface of core layer 506. Substrate layer 502 can be composed of silicon. Although not shown in FIG. 5, a transverse chirped input coupling grating is formed in second cladding layer 508 as shown in FIG. 1A. Detector array 514, such as a linear detector array, is formed in a top surface of substrate layer 502. In some examples, light blocking element 512 is arranged over detector array 514 to reduce unwanted light from entering plenoptic spectrometer 500 and impinging on detector array 514. Plenoptic spectrometer 500 operates by coupling incoming radiation 514 to core layer 506 through the chirped input coupling grating, through first cladding layer 504, and then onto detector array 514. Depending on the anticipated signal levels, detector array 514 can be either PIN devices or avalanche photodiodes, fabricated using well-known techniques. These detector can be fabricated before the waveguide layers were added. Additional electronics are used for readout of detector array 514.

In one embodiment the detector array could be a PIN detector fabricated in the substrate material. In another embodiment the detector array could be an avalanche photodiode array fabricated in the substrate material. In a third embodiment, the material of the detector array could be another semiconductor, such as Ge, GeSi, or III-V material such as GaAs or InGaAsP, epitaxially grown onto the substrate. In a fourth embodiment, the detector material could be bonded to the substrate by well-known techniques, allow flexibility in the detector spectral characteristics.

FIG. 6A shows a side view and FIG. 6B a top view of an arrangement that uses two detector arrays and a single chirped grating according to examples of the present disclosure. This arrangement takes advantage of both forward and backward coupling to increase the spectral range without increasing the grating chirp range. As shown in FIG. 6A the light is incident at an angle θ from the normal to the wafer. Then at each position x along the transversely chirped grating the period is d(x), extending from $d_{min}$ at one end of the transversely chirped grating to $d_{max}$ at the other end, and the wavelength coupling in the forward direction is $\lambda_{forward}=d(n_{guide}+\sin\theta)$ and in the backward direction is $\lambda_{back}=d(n_{guide}-\sin\theta)$. As an example, θ=22°, $n_{guide}$=1.7 and $d_{min}$=302 nm, $\Delta_{forward}$=400 nm and $\Delta_{back}$=626 nm; and at $d_{max}$=460 nm, $\lambda_{forward}$=610 nm and $\Delta_{back}$ is 954 nm, providing full coverage of the visible and near-IR to the limits of the sensitivity of Si detectors. Many other variations are possible and the choice will depend on the specific application.

As shown in FIGS. 6A and 6B, plenoptic spectrometer 600 comprises substrate layer 602, first cladding layer 604 that is formed on a top surface of substrate layer 602, core layer 606 that is formed on a top surface of first cladding layer 604, and second cladding layer 608 that is formed on a top surface of core layer 606. Substrate layer 602 can be composed of silicon. Transverse chirped input coupling grating 616 is formed in second cladding layer 608. Detector array 614, such as a linear detector array, is formed in a top surface of substrate layer 602. In some examples, light blocking element (not shown) is arranged over detector array 614 to reduce unwanted light from entering plenoptic spectrometer 600 and impinging on detector array 614. Plenoptic spectrometer 600 operates by coupling incoming radiation to core layer 606 through the transverse chirped input coupling grating 616, through first cladding layer 604, and then onto detector array 614. Depending on the anticipated signal levels, detector array 614 can be either PIN devices or avalanche photodiodes, fabricated using well-known techniques. These detector can be fabricated before the waveguide layers were added. Additional electronics are used for readout of detector array 614.

The coupling length can be varied over a wide range by adjusting the grating tooth height and the top cladding thickness. As noted below, the achievable resolution is inversely related to $L_C$. As in any grating spectral measurement, resolution is inversely proportional to the number of grating lines contributing to the measurement.

FIG. 7 shows an alternate embodiment incorporating two chirped gratings 616A and 616B and two detector arrays 614A and 614B arranged side by side. The two gratings cover different grating periods and together cover a larger spectral range than each one by itself. The parameters of the two chirped gratings are chosen to allow coverage of an extended wavelength range. This can be extended to a multiplicity of chirped gratings and detector arrays to allow flexibility in the choice of wavelength range and resolution. Appropriate shielding has to be incorporated in the device fabrication to ensure that no incident light impinges directly on the detector arrays.

The aerial dimensions of the present device are ~16×16 cm$^2$ as a result of the need to mount an external detector array; the width of the device (propagation direction) could be readily reduced to <1 mm with an integrated design where the waveguide and gratings are fabricated over the detector array on a single chip. The dimension along the wavelength is set by the detector array and is ultimately a trade-off between spectral coverage, resolution and angular variation capabilities.

FIG. 8 shows a plot of the measured grating period across the collection area compared with model calculation according to examples of the present disclosure. The corresponding coupling wavelengths for TE polarization at an incident angle of θ=27° are shown on the right axis.

FIG. 9A shows the spectrally sensitive portion of the spectrometer according to examples of the present disclosure. Plenoptic spectrometer 900 comprises substrate layer 902, first cladding layer 904 that is formed on a top surface of substrate layer 902, core layer 906 that is formed on a top surface of first cladding layer 904, and second cladding layer 908 that is formed on a top surface of core layer 906. Substrate layer 902 can be composed of silicon. Transverse chirped input coupling grating 916 and Output grating 918 are formed in second cladding layer 908. The light emitted from the waveguide by the output coupler is measured with a detector array (not shown); the spectral information is embedded in the spatial location of the out-coupled light. In some examples, light blocking element (not shown) is arranged over detector array 914 to reduce unwanted light from entering plenoptic spectrometer 900 and impinging on detector array. Plenoptic spectrometer 900 operates by coupling incoming radiation 920 to core layer 906 through transverse chirped input coupling grating 916 onto detector array. Depending on the anticipated signal levels, the detector array can be either PIN devices or avalanche photodiodes, fabricated using well-known techniques. Additional electronics are used for readout of detector array.

The chirped grating was fabricated by interferometric lithography as described in the fabrication section. The chirp can be controlled over wide ranges by adjusting the optical system. For the demonstrations reported here, the measured and simulated pitch variation with position is shown in FIG. 9B. This result is discussed in detail in the fabrication section.

FIGS. 9C and 9D show a plot for measured grating period across the collection area compared with model calculation according to examples of the present disclosure. The corresponding coupling wavelengths for TE polarization at an incident angle of θ=27° are shown on the right axis.

For light incident at an angle θ in the plane defined by the normal to the surface and the grating wavevector, the relation between the grating period and the coupling wavelength is given by the usual grating coupling phase-matching condition:

$$\Delta k(\theta, \lambda, d, j) = \frac{2\pi}{\lambda}\sin\theta \pm j\frac{2\pi}{d(x)} \mp \frac{2\pi}{\lambda}n_{e\!f\!f}^{TE,TM} = 0; \quad (1)$$

$$\lambda = d(x)\left|n_{e\!f\!f}^{TE,TM} \mp \sin\theta\right|/j$$

where j is the grating order (=1 for all experiments reported here) and d(x) is the spatially varying period of the grating within a distance of ~$L_C$ adjacent to the propagation region. The right vertical axis in FIG. 9C and FIG. 9D shows the coupling wavelength for TE-polarization at an angle of 27°. This range can be shifted by changing the incident angle. At the center of the grating (505 nm period) the first-order coupling wavelength varies from 386 nm to 1.521 μm as θ is varied across ±90° covering the entire visible and much of the near-IR spectral range. The variation in the detector response has to be accounted for across this wide spectral coverage.

The resolution of the grating coupler is set by the an appropriate combination of: twice the coupling length, $2L_C$; the width of the source illumination at the grating; and the physical width of the grating. In the current experiments, the $L_C$ of ~360 μm dominates. As stated above, the resonance condition is $\Delta k(\theta, \lambda, d, j)=0$ and the resonance line width is given by $\Delta k(\theta\pm\delta\theta/2, \lambda\pm\delta\lambda/2, d\pm\delta d/2, j) = \pm\pi/2L_C$ where the factor $2L_C$ arises from the electric field decay length whereas $L_C$ is defined as the power decay length. Then the approximate angular, wavelength and period variation bandwidths are given by:

$$\delta\xi\left|\frac{\partial\Delta k(\xi)}{\partial\xi}\right| = \frac{2}{L_C}; \delta\theta = \frac{\lambda}{2\pi L_C\cos\theta}; \quad (2)$$

$$\delta\lambda = \frac{\lambda d}{2\pi L_C\left(1 - d\frac{\partial n_{e\!f\!f}^{TE,TM}}{\partial\lambda}\right)} = \frac{\lambda^2}{2L_C\left(n_{e\!f\!f}^{Te,Tm} - \sin\theta - d\frac{\partial n_{e\!f\!f}^{TE,TM}}{\partial\lambda}\right)};$$

$$\delta d = \frac{d^2}{2\pi L_C} = \frac{\lambda^2}{2\pi L_C\left(n_{e\!f\!f}^{TE,TM} - \sin\theta\right)^2};$$

where ξ represents one of the variables θ, λ or d. At a wavelength of 632.8 nm for an $L_C$ of ~360 μm, this gives: δθ~0.057°; δλ~0.37 nm; and δd~0.33 nm. The waveguide dispersion (∂n/∂λ) includes both material and structural components. The material variations are negligible, but the structural dispersion, ~-4.1×10$^{-4}$ nm$^{-1}$ obtained from the modal calculation, results in about a 20% improvement in the resolution for the present parameters. For the local chirp rate dd/dx~3.3 nm/mm [FIG. 9A], the coupling resonance extends across a width of δx=δd(dd/dx)$^{-1}$~100 μm (approximately 7 pixels for the present 14-μm wide detector pixels).

These relationships are in qualitative agreement with FDTD simulations and consistent with the measurements reported below.

FIG. 10A shows the spectrometer according to examples of the present disclosure. The collimated input beam is incident at an approximately fixed angle across the full width of the grating/detector combination. The spatially dependent grating period results in coupling only in a narrow spatial band for a narrow band source as illustrated schematically. The coupled power propagates in the waveguide across the un-patterned region and is coupled out by the second grating. For FIG. 10A, which represents the proof-of-principle experiments with an external detector array, the light is shown coupled out of the chip at the detection region. For the present experiments, the propagation region is 1.2 cm long to allow for mounting of the commercial detector array and shielding it from any incident or scattered light that does not propagate in the waveguide. In an integrated version of the plenoptic spectrometer, this distance can be substantially decreased to ~100 μm or less, sufficient to provide good modal discrimination. The detector array (Hamamatsu S11639-01; with 2048 14×200 μm² pixels is mounted above the output grating and shielding is added to eliminate any light scattered by the input optics directly to the detector. The detector array is 28 mm long. About 1150 pixels are within the 16 mm extent of the chirped grating, which was limited by the available fabrication arrangement. The detector array has 14 μm wide pixels providing sufficient sampling density for digitization given the resolution in & of 100 μm estimated above. The signal level for all pixels were simultaneously integrated with an electronically controlled time constant. The analog signals are read out sequentially and converted to digital levels with an 8-bit A/D converter. A low-cost microcontroller (Raspberry Pi) can be used to generate the timing signal and read the output of the A/D for further processing. Readout noise was suppressed by a five-point moving average which had a negligible impact on the measured linewidth (<1%).

A schematic of the plenoptic spectrometer principle of operation is shown in FIG. 10B for narrow band illumination at a fixed angle. For each position, the resonant response has the same bandwidth, but the center wavelength is shifted as a result of the chirp of the collection grating. Multiple response curves are shown, each corresponding to a detection pixel. The sampling at the detector is indicated by the marked points.

FIG. 10C shows the spectral measurement for a TE-polarized HeNe laser with an intrinsic linewidth much narrower than the spectrometer resolution limits. The ~1 mm diameter output beam of the laser was directed to the boundary between the chirped grating and the propagation region at an incident angle of ~30.8° to center the response relative to the detector array. The signal acquisition time was 1 s. A five point moving average was used to reduce electronic readout noise. For the present case of a ~ seven data points within the FWHM of the response, this averaging had a negligible impact on the measured FWHM (1% increase). The demonstrated resolution is 0.313 nm; the solid line is a least squares fit to a simple Gaussian lineshape in excellent agreement with the measurement. A conventional laboratory spectrometer system (¼ m) provides essentially identical results. The chirped grating integrated spectrometer resolution could be improved with weaker coupling, e.g. increased $L_C$. To accommodate increased resolution, it will also be necessary to decrease the chirp rate of the grating to allow a higher sampling density and to increase the A/D bit resolution. Reducing the length of the waveguide propagation region will reduce any beam spreading effects that may be influencing the result. For the present device, the chirped grating covers a wavelength range of 70 nm over a width of 16 mm which subtends ~1150 pixels of the commercial detector with 14 μm wide pixels, giving a wavelength increment of 0.06 nm/pixel. This combination of resolution and pixel density is much greater than has been accomplished with any other lab-on-a-chip spectrometer approach.

The result for a red LED along with a polarizer set to transmit TE polarization is shown in FIG. 10D along with a comparison with the laboratory-scale spectrometer. The peak wavelength for the LED is λ=623.5 nm. The angle of incidence of the LED beam was tuned to 31.8°, to shift the response to the center of the detector. The blue tail of the LED is clearly observed. Note the very different wavelength scale as compared with the laser result. Again, a five-point moving average was used with a 1 s integration time.

As was discussed above, the TE and TM polarizations exhibit different effective indices and, therefore, different coupling angles. This is shown in FIG. 11 where the output of a linearly polarized red diode laser at 660 nm was used as a source. The beam was spread to cover the full range of the chirped grating and was incident at 22° with the polarization set at ~ 45° to the grating lines. As expected two peaks are observed corresponding to TE and TM polarizations.

This dual response at the same wavelength can be eliminated with the use of an external polarizer. Alternatively, since the TM mode is more loosely bound (lower effective refractive index) it is possible to engineer the bottom oxide thickness and un-patterned propagation length to selectively absorb the TM mode as it traverses the propagation region while having no impact on the TE mode intensity.

FIG. 11 shows a plot of a normalized signal versus grating period. Because the effective indices differ for TE and TM polarization, the coupling angles are different for the two polarizations. Result for a 660 nm wavelength, narrow-band laser source.

The details of the layer structure were described in connection with the planar waveguide discussion. A single photoresist step, with multiple exposures was used to fabricate the three distinct sections: chirp grating collection area; propagation region; and detection region on a single device area. The multiple exposures and the die scale fabrication were dictated by the restricted equipment set available, these could all be combined into a single exposure with a contemporary wafer-scale optical lithography exposure tool. The layer structure was first deposited and the wafer was cleaned and a single die was separated from the wafer. A bottom anti-reflection coating (BARC) layer (icon 7™ ~70 nm thick) was spin-coated and hot-plate prebaked at 180° C. for 1 min., followed by spin-deposition of NR7-500P resist (negative tone) and prebake at 150° C. for 1 min. The wafer is then exposed using a Seuss MJB3 mask aligner (~2 μm resolution) to define the propagation region. Next, the collection region is masked and a 400 nm period uniform grating with a 50:50 line:space ratio is defined in the detection region using 355-nm interferometric lithography (IL). For a third exposure in the same resist coating, the detection region is masked and a chirped grating was defined by IL with converging spherical beams as described below. After these exposures, a post-exposure bake (110° for 1 min.) is performed before developing. Then the sample is developed in developer MF-321 for 60 s. After development a $O_2$ reactive-ion etch is used to etch through the BARC remaining in the grating regions, and an inductively coupled plasma ($CF_4$) is used to etch ~350 nm deep into the 450 nm thick top $SiO_2$ cladding. A 45° cross section SEM of the resulting etch profile of the chirped grating is shown in FIG. 1B.

FIG. 12 shows a schematic of the interferometric lithography arrangement used to pattern the chirped grating from Benoit S. & Brueck, S. R. J. Design of chirped gratings using interferometric lithography, IEEE Phot. J. 10, 1-13 (2018). In the IL setup for the chirped grating (FIG. 12), a plano-convex lens with a focal length of 51.5 mm is used to convert the approximately planar wave fronts of the two interfering beams to spherical wave fronts converging to two the foci behind the photoresist-coated die. Coordinate systems (X, Y, Z) and (X', Y', Z) are shown in the schematic to explain the setup. For expository purposes, the collimated coherent incident beam coming from the left-hand side is intentionally drawn as two separate circular cross-section portions, in the experiment it is a single beam. One portion of the plane-wave incident beam impinges directly onto the spherical lens, is modified to a converging spherical wave, and is focused to point B. Likewise, the other portion of the incident beam, after being reflected by the mirror, is focused to point A. The grating period at the wafer as a function of the position on the die is given by:

$$\Lambda(x, y) = \frac{\lambda_{IL}}{\sqrt{\frac{(x+L)^2 + y^2 + (D\sin\beta)^2}{(x+L)^2 + y^2 + D^2} + \frac{x^2 + y^2 - L^2 + (D\sin\beta)^2}{\sqrt{[(x+L)^2 + y^2 + D^2][(x-L)^2 + y^2 + D^2]}} + \frac{(x-L)^2 + y^2 + (D\sin\beta)^2}{(x-L)^2 + y^2 + D^2}}} \quad (3)$$

where $\lambda_{IL}$ is the 355 nm IL laser wavelength and (x, y) are the spatial coordinates on the die. L=27.1 mm is the half separation between the two foci which is a function of the incident beam angles and, D=79.5 mm is the longitudinal distance from the plane of the two foci to the back surface of the plano-convex lens. β=45°, is the photoresist-coated wafer tilt angle. Note that this tilt of the wafer is critical for obtaining a transversely chirped grating since it adds the impact of the focusing in the x-direction while leaving the y-direction pattern unchanged with a small quadratic chirp. After development of the photoresist, the full pattern (both gratings) is transferred into the 450 nm thick $SiO_2$ top cladding of the $Si_3N_4$ waveguide core using inductively coupled plasma etching to a depth of 350 nm. The period variation is shown, exaggerated for visualization, across the collection area grating coupler in FIG. 1A. In order to measure the local grating period across the chirped grating region, the angular response to red laser light with $\lambda$=660 nm was registered every mm across the 16 mm wide chirped grating region. From the coupling angle of the red laser at each detector position and the effective index of the waveguide, the pitch at each position can be calculated using the coupling equation [Eq. (1)]. FIG. 8 shows the measured grating period in excellent agreement with the predicted variation (solid curve) from Eq. (3). As shown in FIG. 8, the chirp range across the 16 mm wide grating coupler is ΔΛ=70 nm for a chirp rate of 4.6 nm/mm.

A plenoptic (angle of incidence and wavelength sensitive) spectrometer comprising a transversely chirped grating waveguide coupler along with a propagation region to eliminate non-propagating (cut-off) modes and a second grating for out-coupling has been demonstrated as a fully CMOS-compatible spectrometer. For the present preliminary demonstration, an externally mounted, 2048 element linear array CMOS detector was used to capture the spectrum. In future iterations, this detector will be integrated underneath the waveguide. For a HeNe laser, a resolution-limited line width FWHM of 0.313 nm has been demonstrated. This resolution is a direct result of the chirped grating physics and does not require any signal processing deconvolution. The fabrication process involves only a single lithography step that is well within the capabilities of IC industry optical lithography tools.

Higher resolutions are available by increasing the coupling length (proportional to the number of grating lines involved in the coupling and therefore inversely proportional to the coupling length). The full wavelength scan of the present device at a fixed angle of incidence was ~70 nm, limited by the grating chirp and the 16 mm width of the fabricated chirped grating. The full width of the sensor was 28.7 mm, so the accessible range is 125 nm for the same chirp with an improved grating fabrication and can be increased to ~300 nm to cover the full 400- to 700-nm visible range with a factor of 2.4 increase in the chirp which can be accomplished with straightforward changes to the optics. For the present device, the wavelength range can be extended across the visible and near-IR (within the sensitivity range of the Si detection) by changing the angle of incidence. As always there is a trade-off between wavelength resolution and wavelength coverage.

The wavelength range of the device can be extended by using different detector materials and different waveguide materials. In particular, the technologically important telecommunications bands at 1.3- and 1.55 mm can be reached using, for example, InGaAs or Ge detectors in place of the Si detectors. Techniques for integrating detectors based on these semiconductor materials with Si substrates, either by epitaxial growth or wafer bonding, are well known.

To extend the wavelength coverage further into the infrared, both the waveguide materials and the detector materials need to be modified. There are well-known infrared transmissive glasses that can be used for the waveguide; infrared detection is possible with materials such as GaSb strained layer superlattice detectors and InAs/GaAs quantum well/dot systems.

Table I provides some context of the various demonstrated approaches to a free-space input integrated spectrometer. Not all of the subtleties are captured in the table, but it provides a first cut at sorting through the possibilities. The spectrally sensitive element is the dispersive element; the manufacturing process defining the spectrally sensitive element is provided; the spectral range column lists the extensibility throughout the spectrum, of course only the UV-VIS-NIR range out to about 1 µm is available to an integrated circuit chip with silicon-based detection; the deconvolution column notes the requirement for signal-processing to retrieve the spectrum from a number of broadband spectral elements; finally the CMOS integration column notes the use of materials and processes that are compatible with standard IC manufacturing facilities. Only this fully CMOS-compatible, high-volume manufacturing capable, plenoptic array has demonstrated sub-nm resolution using conventional optical lithography, with sufficient physics-based spectral resolution to avoid the need for signal processing deconvolution and with an unprecedented pixel density. This on-chip, CMOS compatible, plenoptic spectrometer concept is poised to enable a broad range of applications that are beyond the reach of existing single-chip spectroscopic technologies.

TABLE 1

Comparison of demonstrated approaches to chip-based free space spectroscopy.

| Ref | Dispersive Element | Fab.* | Spectral Range† | Resol. (nm) | # Pixels§ | Deconv. Rqd. | CMOS Integ. |
|---|---|---|---|---|---|---|---|
| — | Chirped grating | OL | UV, V, NIR, IR | 0.3 | 1150 | N | Y |
| 1 | Filter bank array | TFD | UV, V, IR | >1.7 | 128 | Y | N |
| 2 | Waveguide and 2D photonic xtal | EBL | V, NIR, IR | 80 | 9 | Y | Y |
| 3 | Digital planar hologram | NIL | V | 0.2 | 42 | Y | Y |
| 4 | 2D photonic crystal | EBL | NIR | 0.75 | 25 | Y | N |
| 5 | Colloidal quantum dots | CNG | V, NIR | 2 | 195 | Y | N |
| 6 | Plasmonics | OL | Red, NIR, IR | 3.1 | 17 | Y | Y |
| 7 | DBR & metasurface | EBL | NIR, IR | 2 | NS | N | N |
| 8 | Folded metasurface | EBL | NIR, IR | 1.2 | 80 | N | N |
| 9 | 2D photonic crystal | EBL | V, NIR, IR | 1 | 25 | Y | Y |

*OL—optical lithography; TFD—thin film deposition; EBL—electron beam lithography, NIL—nanoimprint lithography; CNG—colloidal nanocrystal growth
†V—visible; NIR—near-infrared (~1550 nm); IR—3-10 μm; all schemes using silicon detection are limited to wavelengths shorter than ~1 μm.
§NS—not specified 1. Wang, S-W.; Xia, C.; Chen, X.; Lu, W.; Li, M.; Wang, H.; Zheng, W.& Zhang, T. Concept of a high-resolution miniature spectrometer using an integrated filter array, *Opt. Lett.* 32, 632-634 (2007).
2. Pervez, N. K.; Cheng, W.; Jia, Z.; Cox, M. P.; Edrees J. M.; & Kymissis, I. Photonic crystal spectrometer, *Opt. Exp.* 18, 8277-8282 (2010).
3. Pero., C.; Dhuey, S.; Goltsov, A.; Volger, M.; Harteneck, B.; Ivonin, I.; Bugrov, A.; Cabrini, S.; Bavin S. & Yankov, Y. Digital spectrometer-on-chip fabricated by step and repeat nanoimprint lithography and pre-spin coated films, *Microelec. Engr.* 88, 2092-2095 (2011).
4. Wang, Z.; Yi, S.; Chen, A.; Zhou, M.; Luk, T. S.; James, A.; Nogan, J.; Ross, W.; Joe, G.; Wang, K. X., Kats M. A. & Zu, Y. Single-shot on-chip spectral sensors based on photonic crystal slabs, *Nature Comm.* 10, 1020 (2019).
5. Bao, J; & Bawendi, M. G. A colloidal quantum dot spectrometer, *Nature* 523, 67-70(2015).
6. Tsur Y. & Arie, A. On-chip plasmonic spectrometer, *Opt. Lett.* 41, 3523-3526 (2016).
7. Horie, Y.; Arbabi, A.; Arbabi, E.; Kamali S. M. & Faraon, A. Wide bandwidth and high resolution planar filter array based on DBR-metasurface-DBR structures, *Opt. Exp.* 24, 11677-11682 (2016).
8. Faraji-Dana, M.; Arbabi, E.; Arbabi, A.; Kamali, S. M.; Kwon, H. & Faraon, A. Compact folded metasurface spectrometer, *Nature Comm.* 9, 4196-4203 (2018).
9. Gan, X.; Pervez, N.; Kymissis, I.; Hatami, F.; & Englund, D. A high resolution spectrometer based on a compact planar two dimensional photonic crystal cavity array, *Appl. Phys. Lett.* 100, 231104 (2012).

FIG. 12 shows a method 1200 for forming a spectral sensor according to examples of the present disclosure. The method 1200 of forming a spectral sensor is begun by forming a detector array on a substrate, as in 1202. The method 1200 of forming a spectral sensor continues by providing a planar waveguide atop the substrate, as in 1204. The method 1200 of forming a spectral sensor continues by forming a chirped input grating to couple incident light into the planar waveguide, as in 1206. The chirped input coupling grating comprises a first transverse chirp to provide a spectrally selective coupling of incident light into the planar waveguide. The method 1200 of forming a spectral sensor continues by forming a propagation region to filter out light that is not coupled into the planar waveguide, as in 1208. The method 1200 of forming a spectral sensor continues by forming a restriction mechanism that restricts a range of angles of incidence of light impinging onto the chirped input coupling grating, as in 1210. The method 1200 of forming a spectral sensor continues by forming an electrical circuit to readout output signals from the detector array, as 1212. In some examples, method 1200 of forming a spectral sensor can further comprise forming an output grating that couples the light from the planar waveguide to the detector array, as in 1214. The output grating can comprise a second transverse chip. The second transverse chirp can have a different chirp period than the first transverse chirp. The chirped input coupling grating can comprise a variation of the grating period along a length of the grating, and wherein a spectral composition of light coupled into the waveguide varies as a result of variation of the grating period along the length of the grating. In some examples, the method 1200 of forming a spectral sensor can further comprise forming a light block to shield the detector array from incident light scattered into the detector array that is not coupled into the planar waveguide, as in 1216. In some examples, the detector array is arranged above an output coupling grating fabricated in the detection region. In some examples, the detector array is fabricated in the substrate and arranged to intercept the modal fields of light propagating in the waveguide in the detection region. In some examples, the detector array is fabricated in a semiconductor material epitaxially grown on the substrate and arranged to intercept the modal fields of light propagating in the waveguide in the detection region. In some examples, the detector array is fabricated in a semiconductor material that is wafer bonded to the substrate and arranged to intercept the modal fields of light propagating in the waveguide in the detection region. It will be understood that the order of these steps may be altered based on the specifics of the fabrication process. For example, the coupling grating could be fabricated in either the top or bottom cladding of the planar waveguide.

While the present teachings have been illustrated with respect to one or more implementations, alterations and/or modifications may be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages may be added or existing structural components and/or processing stages may be removed or modified.

Further, one or more of the acts depicted herein may be carried out in one or more separate acts and/or phases. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "about" indicates that the value listed may be somewhat altered, as long as the alteration does not result in nonconformance of the process or structure to the illustrated embodiment. Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C. The term "at least one of" is used to mean one or more of the listed items may be selected. Finally, "exemplary" indicates the description is used as an example, rather than implying that it is an ideal.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A spectral sensor comprising:
   a planar waveguide on a semiconductor substrate;
   a restriction mechanism that restricts a range of angles of incidence of light;
   a transversely chirped input grating comprising grating lines that are tilted with respect to each other, such that a period of the transversely chirped input grating varies along the grating lines of the transversely chirped input grating, formed to couple incident light into the planar waveguide to provide a spatially and spectrally selective coupling of incident light into the planar waveguide;
   a propagation region to filter out light that is not coupled into the planar waveguide;
   a detector array arranged on the opposite side of the propagation region from the chirped input grating;
   a transversely chirped output grating comprising grating lines that are tilted with respect to each other, such that a period of the transversely chirped output grating varies along the grating lines of the transversely chirped output grating and differently than the transversely chirped input grating, that couples the light from the planar waveguide to the detector array; and
   an electrical circuit to readout output signals from the detector array.

2. The spectral sensor of claim 1, further comprising a light block to shield the detector array from incident light that is not coupled into the planar waveguide.

3. The spectral sensor of claim 1, wherein the planar waveguide comprises a bottom cladding, a waveguide core, and a top cladding.

4. The spectral sensor of claim 3, wherein the top cladding and the bottom cladding are comprised of silicon dioxide and the waveguide core is comprised of silicon nitride.

5. The spectral sensor of claim 1, wherein additional electronics is fabricated along with the detector array for readout of the detection signals.

6. The spectral sensor of claim 1, wherein the detector array is fabricated in a different semiconductor material that is epitaxially grown on the semiconductor substrate.

7. The spectral sensor of claim 1, wherein the detector array is fabricated in a different material system from that of the substrate and is wafer bonded to the substrate.

8. The spectral sensor of claim 1, wherein the detector array is electrically connected to electronics fabricated in the substrate that generates one or more electrical signals corresponding to a spectrum of the incident light which is incident at a fixed angle.

9. A method of forming a spectral sensor comprising:
   providing a semiconductor substrate;
   forming a detector array on the semiconductor substrate;
   forming a planar waveguide on the semiconductor substrate;
   forming a transversely chirped input grating comprising grating lines that are tilted with respect to each other, such that a period of the transversely chirped input grating varies along the grating lines of the transversely chirped input grating, to couple incident light into the planar waveguide, wherein the transversely chirped input grating provides a spatially and spectrally selective coupling of incident light into the planar waveguide;
   forming a propagation region to filter out light that is not coupled into the planar waveguide;
   forming a restriction mechanism that restricts a range of angles of incidence of light impinging onto the chirped input grating;
   forming a transversely output grating comprising grating lines that are tilted with respect to each other, such that a period of the transversely chirped output grating varies along the grating lines of the transversely chirped output grating and differently than the transversely chirped input grating, that couples the light from the planar waveguide to the detector array; and
   forming an electrical circuit to readout output signals from the detector array.

10. The method of claim 9, further comprising forming a light block to shield the detector array from incident light scattered into the detector array that is not coupled into the planar waveguide.

11. The method of claim 9, wherein the detector array is fabricated in the semiconductor substrate.

12. The method of claim 9, wherein the detector array and associated electronics is fabricated in a separate chip, is mounted atop the waveguide, and the output grating is fabricated near the waveguide to couple light propagating in the waveguide to the detector array.

13. The method of claim 9, wherein the detector array is fabricated in a semiconductor material that is wafer bonded to the substrate.

\* \* \* \* \*